C. J. JONASSON.
Smoking-Pipe.

No. 165,002. Patented June 29, 1875.

WITNESSES:
E. Wolff
A. F. Terry

INVENTOR:
C. J. Jonasson
by Munn & Co.
ATTORNEYS.

UNITED STATES PATENT OFFICE.

CARL J. JONASSON, OF WARREN, PENNSYLVANIA.

IMPROVEMENT IN SMOKING-PIPES.

Specification forming part of Letters Patent No. 165,002, dated June 29, 1875; application filed May 8, 1875.

*To all whom it may concern:*

Figure 1:
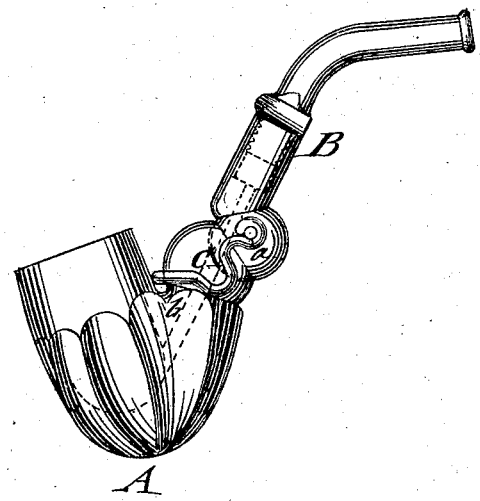
Figure 2:
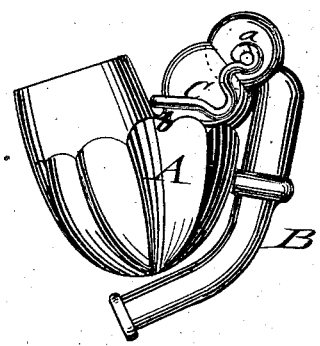

Be it known that I, CARL J. JONASSON, of Warren, in the county of Warren and State of Pennsylvania, have invented a new and Improved Smoking-Pipe, of which the following is a specification:

In the accompanying drawing, Figures 1 and 2 represent side views of my improved smoking-pipe, one showing the same ready for use, the other folded up.

Similar letters of reference indicate corresponding parts.

The object of my invention is to provide a smoking-pipe, the stem of which may be readily folded down to the bowl, so as to occupy a small space in the pocket, be less liable to get broken, and easily taken apart for being cleaned.

The invention consists of a pipe-bowl with detachable stem hinged, by ball-and-socket joint and connecting-link, thereto.

In the drawing, A represents a pipe-bowl, of any shape or material; and B, the pipe-stem, which is made separate therefrom, and connected to the bowl by a suitable bent link, C, of wire or other material. Bowl and stem are connected by ball-and-socket joint, which allows the ready swinging of the stem on the socket of the bowl in connection with the link, which is applied to projecting pivot-pins $a$ of the ball end of the stem.

The link C may be readily attached or detached from the bowl, so as to produce the separation of the stem therefrom, for cleaning the parts more conveniently, an indentation, $b$, of the socket part of the bowl serving to retain the link by its spring action on the same, and secure thereby the intimate contact of the stem and bowl.

The stem is readily thrown, by link and joint, into position on the bowl for being used for smoking—that is to say, the hole in the stem and that in the socket portion of the bowl coincide and form one continuous passage when the parts are adjusted as shown in Fig. 1.

The stem may be folded down along the bowl after use, to be more conveniently carried in the pocket. It forms a very handy pipe for workmen, as it takes up little room, is not easily broken, and readily cleaned.

Having thus described my invention, I claim as new and desire to secure by Letters Patent—

1. The combination of the hinged stem with the bowl of the pipe, as shown and described.

2. The stem and bowl, connected by a ball-and-socket joint, and the pivoted fastening-link C, arranged to lock the parts together by engaging with a projecting portion of the bowl, all combined as shown and described.

CARL JOHAN JONASSON.

Witnesses:
JAMES C. WELLS,
ALEX. H. MCKELVEY.